(12) United States Patent
Lee

(10) Patent No.: US 10,885,650 B2
(45) Date of Patent: Jan. 5, 2021

(54) IMAGE DEVICE UTILIZING NON-PLANAR PROJECTION IMAGES TO GENERATE A DEPTH MAP AND RELATED METHOD THEREOF

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 362 days.

(21) Appl. No.: 15/903,055

(22) Filed: Feb. 23, 2018

(65) Prior Publication Data

US 2018/0286067 A1    Oct. 4, 2018

Related U.S. Application Data

(60) Provisional application No. 62/462,363, filed on Feb. 23, 2017, provisional application No. 62/479,331, filed on Mar. 31, 2017.

(51) Int. Cl.
*G06T 7/593* (2017.01)
*G06T 3/00* (2006.01)

(52) U.S. Cl.
CPC ............ *G06T 7/593* (2017.01); *G06T 3/0062* (2013.01); *G06T 2207/10012* (2013.01)

(58) Field of Classification Search
CPC .................................................. G06T 3/0062
See application file for complete search history.

(56) References Cited

U.S. PATENT DOCUMENTS

| 2017/0264890 A1* | 9/2017 | Gorilovsky ........... B66B 13/303 |
| 2018/0139431 A1* | 5/2018 | Simek .................. H04N 13/254 |
| 2018/0374192 A1* | 12/2018 | Kunkel ................. G06T 15/205 |

FOREIGN PATENT DOCUMENTS

| CN | 102005039 A | 4/2011 |
| CN | 104835117 A | 8/2015 |
| CN | 106331527 A | 1/2017 |

* cited by examiner

*Primary Examiner* — Edward Park
(74) *Attorney, Agent, or Firm* — Winston Hsu

(57) ABSTRACT

An image device utilizing non-planar projection images to generate a depth map includes two image capturers and a depth engine. The two image capturers are used for generating two non-planar projection images, wherein when each non-planar projection image of the two non-planar projection images is projected to a space corresponding to an image capturer corresponding to the each non-planar projection image, projection positions of each row of pixels of the each non-planar projection image in the space and optical centers of the two image capturers share a plane. The depth engine is used for generating a depth map according to the two non-planar projection images.

6 Claims, 14 Drawing Sheets

IMAGE DEVICE UTILIZING NON-PLANAR PROJECTION IMAGES TO GENERATE A DEPTH MAP AND RELATED METHOD THEREOF

CROSS REFERENCE TO RELATED APPLICATION

This application claims the benefit of U.S. Provisional Application No. 62/462,363, filed on Feb. 23, 2017 and entitled "Camera with Panoramic Image and Depth Information," and the benefit of U.S. Provisional Application No. 62/479,331, filed on Mar. 31, 2017 and entitled "Camera with Panoramic Image and Depth Information and Depth Capturing Device and System," the contents of which are incorporated herein by reference.

BACKGROUND OF THE INVENTION

1. Field of the Invention

The present invention relates to an image device for generating a depth map and a related method thereof, and particularly to an image device and a related method thereof that can utilize non-planar projection images to generate a depth map.

2. Description of the Prior Art

When the prior art generates a 360 degree panoramic depth map, the prior art utilizes a plurality of planar images for forming a 360 degree panoramic image to generate depth maps corresponding to a plurality of view angles, wherein a sum of the plurality of view angles is not less than 360 degree. Then, the prior art utilizes the depth maps corresponding to the plurality of view angles to generate the 360 degree panoramic depth map. Similarly, when the prior art generates a part of the 360 degree panoramic depth map, the prior art utilizes at least one planar image for forming the part of the 360 degree panoramic depth map to generate a depth map corresponding to at least one view angle. Then, the prior art utilizes the depth map corresponding to the at least one view angle to generate the part of the 360 degree panoramic depth map. Therefore, because the prior art utilizes the plurality of planar images to generate the 360 degree panoramic depth map (or utilizes the at least one planar image to generate the part of the 360 degree panoramic depth map), the prior art needs more image capturers, resulting in cost and production difficulty required by the prior art being higher, and product volume provided by the prior art being larger. Therefore, how to reduce a number of image capturers required by the prior art to generate the 360 degree panoramic depth map (or generate the part of the 360 degree panoramic depth map) becomes an important issue.

SUMMARY OF THE INVENTION

An embodiment of the present invention provides an image device utilizing non-planar projection images to generate a depth map. The image device includes two image capturers and a depth engine. The two image capturers are used for generating two non-planar projection images, wherein when each non-planar projection image of the two non-planar projection images is projected to a space corresponding to an image capturer corresponding to the each non-planar projection image, projection positions of each row of pixels of the each non-planar projection image in the space and optical centers of the two image capturers share a plane. The depth engine is used for generating a depth map according to the two non-planar projection images.

Another embodiment of the present invention provides a method utilizing non-planar projection images to generate a depth map. The method includes utilizing two image capture groups to generate two 360 degree images, wherein each image capture group of the two image capture groups includes at least two image capturers, when a partial image of a 360 degree image of the two 360 degree images corresponding to a predetermined view angle is projected to a space, projection positions of each row of pixels of the partial image of the 360 degree image in the space and optical centers of corresponding image capturers of the two image capture groups share a plane, and the space corresponds to one image capturer of the corresponding image capturers; and utilizing a depth engine to generate a depth map according to the two 360 degree images.

Another embodiment of the present invention provides an image device utilizing non-planar projection images to generate a depth map. The image device includes two image capture groups and a depth engine. The two image capture groups are used for generating two 360 degree images, wherein each image capture group of the two image capture groups includes at least two image capturers, and when a partial image of a 360 degree image of the two 360 degree images corresponding to a predetermined view angle is projected to a space, projection positions of each row of pixels of the partial image of the 360 degree image in the space and optical centers of corresponding image capturers of the two image capture groups share a plane, and the space corresponds to an image capturer of the corresponding image capturers. The depth engine is used for generating a depth map according to the two 360 degree images.

Another embodiment of the present invention provides an image device utilizing non-planar projection images to generate a depth map. The image device includes two image capture groups and a depth engine. The two image capture groups are used for generating two 360 degree images, wherein each image capture group of the two image capture groups includes an image capturer and a mirror, the image capturer faces to the mirror and generates a corresponding 360 degree image of the two 360 degree images through reflected light generated by the mirror, the corresponding 360 degree image corresponds to at least one virtual optical center of the mirror, when a partial image of a 360 degree image of the two 360 degree images corresponding to a predetermined view angle is projected to a space, projection positions of each row of pixels of the partial image of the 360 degree image in the space and two corresponding virtual optical centers of at least two virtual optical centers of the two image capture groups share a plane, and the space corresponds to a virtual optical center of the two corresponding virtual optical centers. The depth engine is used for generating a depth map according to the two 360 degree images.

The present invention provides an image device utilizing non-planar projection images to generate a depth map and a related method thereof. The image device and the method generate a 360 degree panoramic (or spherical, or cylindrical) depth map, or generate a part of the 360 degree panoramic (or spherical, or cylindrical) depth map according to at least two non-planar projection images, compared to the prior art, the present invention needs less image capturers. That is, the present invention can utilize simpler mechanism to generate the 360 degree panoramic (or spherical, or cylindrical) depth map, or generate the part of the 360 degree panoramic (or spherical, or cylindrical) depth map.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
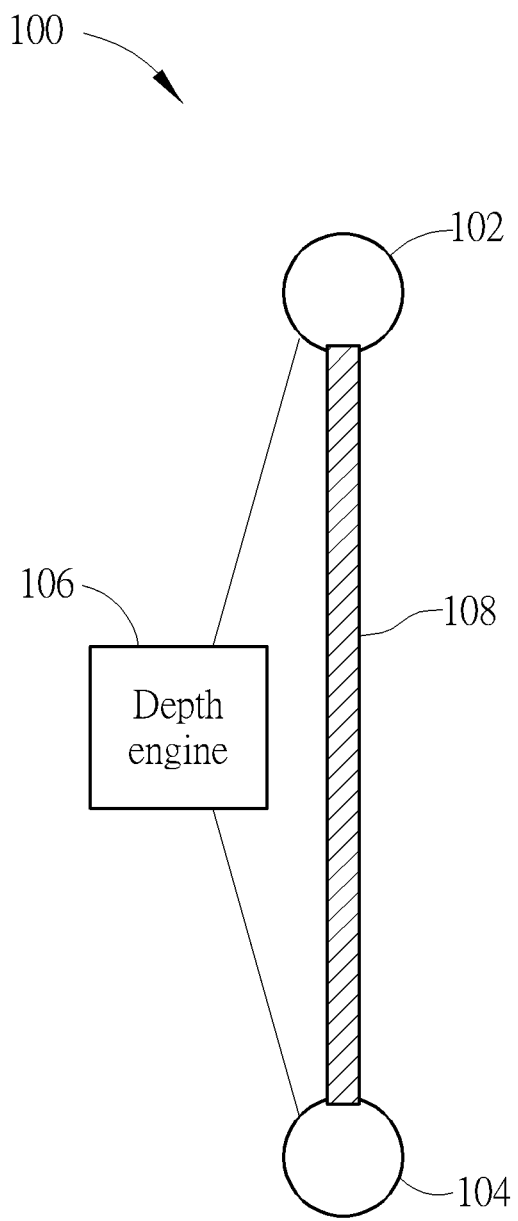
FIG. 1 is a diagram illustrating an image device utilizing non-planar projection images to generate a depth map according to a first embodiment of the present invention.
Figure 2:
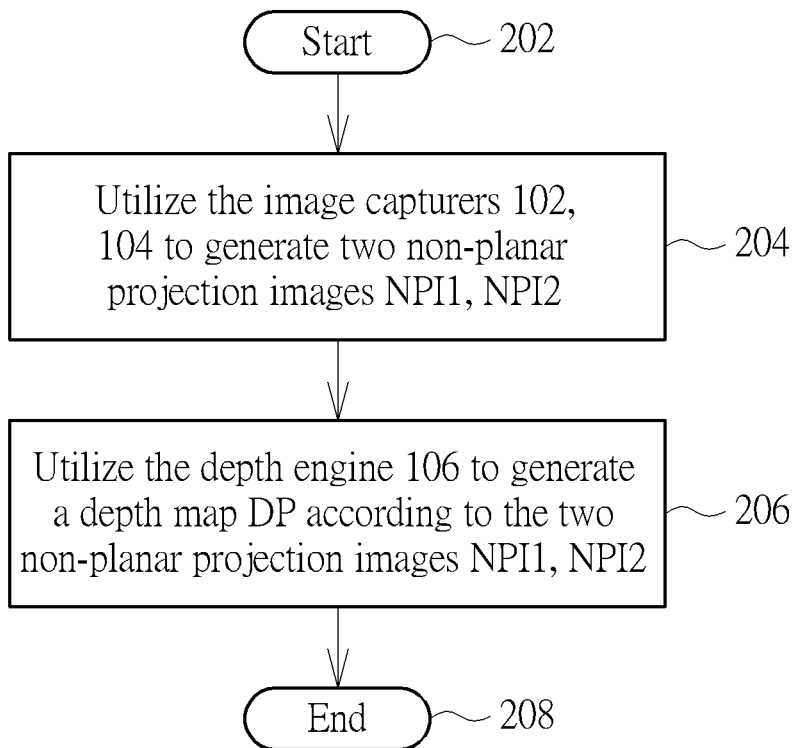
FIG. 2 is a flowchart illustrating a method utilizing non-planar projection images to generate a depth map according to a second embodiment of the present invention.

Please refer to FIGS. 1, 2. FIG. 1 is a diagram illustrating an image device 100 utilizing non-planar projection images to generate a depth map according to a first embodiment of the present invention, and FIG. 2 is a flowchart illustrating a method utilizing non-planar projection images to generate a depth map according to a second embodiment of the present invention, wherein the image device 100 includes two image capturers 102, 104 and a depth engine 106. As shown in FIG. 1, both the image capturers 102, 104 are fisheye image capturers and have a 360 degree view angle, wherein the depth engine 106 is electrically connected to the image capturers 102, 104, and a support unit 108 exists between the image capturers 102, 104. In addition, it is obvious to one of ordinary skill in the art that each image capturer of the image capturers 102, 104 at least includes a lens and an image sensor (e.g. a charge-coupled device (CCD) image sensor or a complementary metal-oxide-semiconductor image sensor). In another embodiment of the present invention, the each image capturer further includes an image signal processor (ISP) and a remapping processor. In addition, in another embodiment of the present invention, the image signal processor and the remapping processor included in the each image capturer are integrated into the depth engine 106. In addition, the method in FIG. 2 is illustrated by the image device 100 in FIG. 1. Detailed steps are as follows:

Step 202: Start.

Step 204: Utilize the image capturers 102, 104 to generate two non-planar projection images NPI1, NPI2.

Step 206: Utilize the depth engine 106 to generate a depth map DP according to the two non-planar projection images NPI1, NPI2.

Step 208: End.

Figure 3:
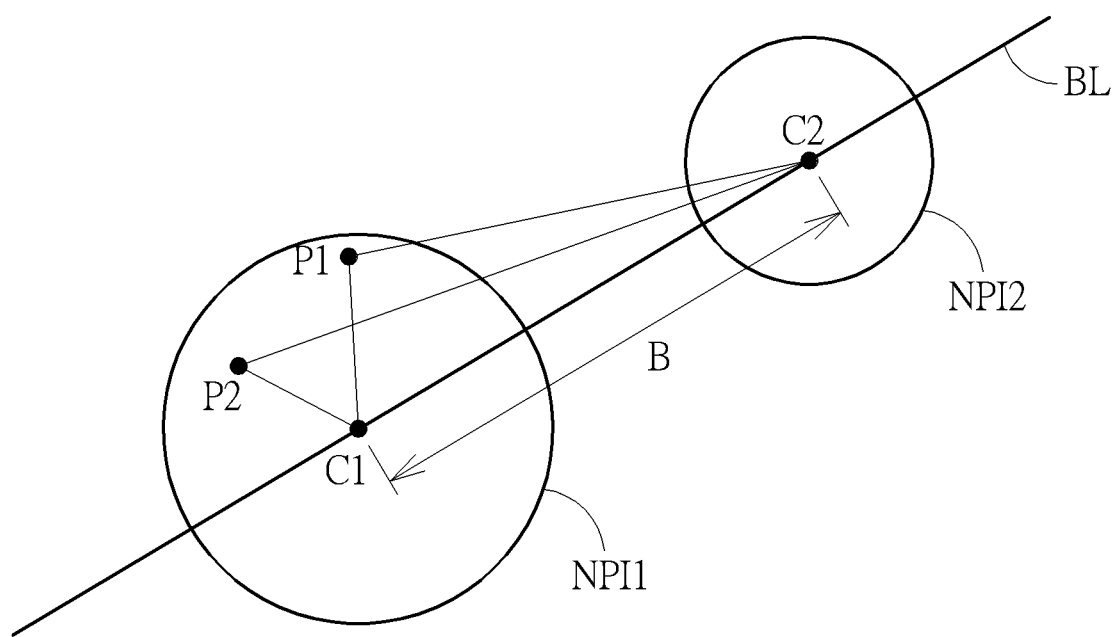
FIG. 3 is a diagram illustrating the non-planar projection image corresponding to the optical center of the image capturer when the non-planar projection image is projected to the first space.
Figure 4:
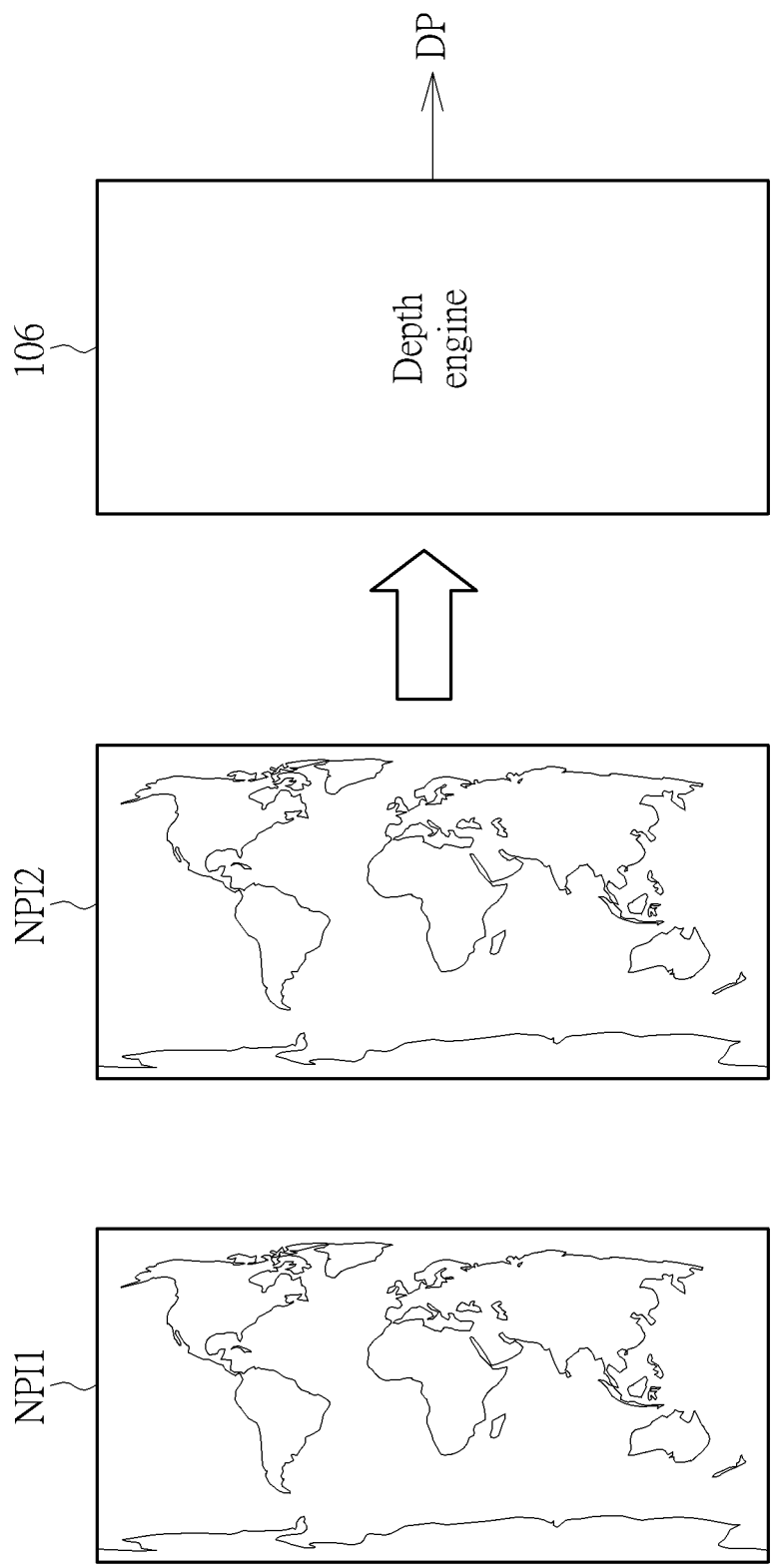
FIG. 4 is a diagram illustrating the depth engine generating the depth map directly according to the non-planar projection images.

In Step 204, the image capturers 102, 104 can generate the non-planar projection images NPI1, NPI2 respectively, wherein in one embodiment of the present invention, the non-planar projection images NPI1, NPI2 are 360 degree spherical images. That is, the non-planar projection images NPI1, NPI2 are non-pinhole projection images. In addition, in another embodiment of the present invention, each non-planar projection image of the non-planar projection images NPI1, NPI2 can also be a partial image of a 360 degree spherical image. Therefore, when the each non-planar projection image of the non-planar projection images NPI1, NPI2 is projected to a space corresponding to an image capturer corresponding to the each non-planar projection image, a characteristic of the non-planar projection images NPI1, NPI2 is projection positions of each row of pixels of the each non-planar projection image in the space and optical centers C1, C2 of the two image capturers 102, 104 share a plane. Please refer to FIG. 3. FIG. 3 is a diagram illustrating the non-planar projection image NPI1 being projected to a first space corresponding to the image capturer 102 and the non-planar projection image NPI2 being projected to the first space corresponding to the image capturer 104. As shown in FIG. 3, when the non-planar projection image NPI1 and the non-planar projection image NPI2 are projected to the first space, the non-planar projection image NPI1 corresponds to the optical center C1 of the image capturer 102 and the non-planar projection image NPI2 corresponds to the optical center C2 of the image capturer 104, wherein the optical center C1 and the optical center C2 are located at a baseline BL between the image capturer 102 and the image capturer 104, and a distance B exists between the optical center C1 and the optical center C2. As shown in FIG. 3, projection positions of each row of pixels (e.g. pixels P1, P2) of the non-planar projection image NPI1 in the first space, the optical center C1, and the optical center C2 share a plane. That is, as shown in FIG. 3, a first triangle formed by the pixels P1, P2 and the optical center C1 and a second triangle formed by the pixels P1, P2 and the optical center C2 share a plane. Because the non-planar projection images NPI1, NPI2 have the characteristic, the depth engine 106 can generate a depth map DP (shown in FIG. 4) directly according to the non-planar projection images NPI1, NPI2. That is, before the depth engine 106 executes a corresponding feature point search on the non-planar projection images NPI1, NPI2 to generate the depth map DP, the depth engine 106 can only execute a horizontal matching search on the non-planar projection images NPI1, NPI2 to reduce operational burden of the image device 100. In addition, the depth map DP is a 360 degree spherical depth map.

Figure 5:
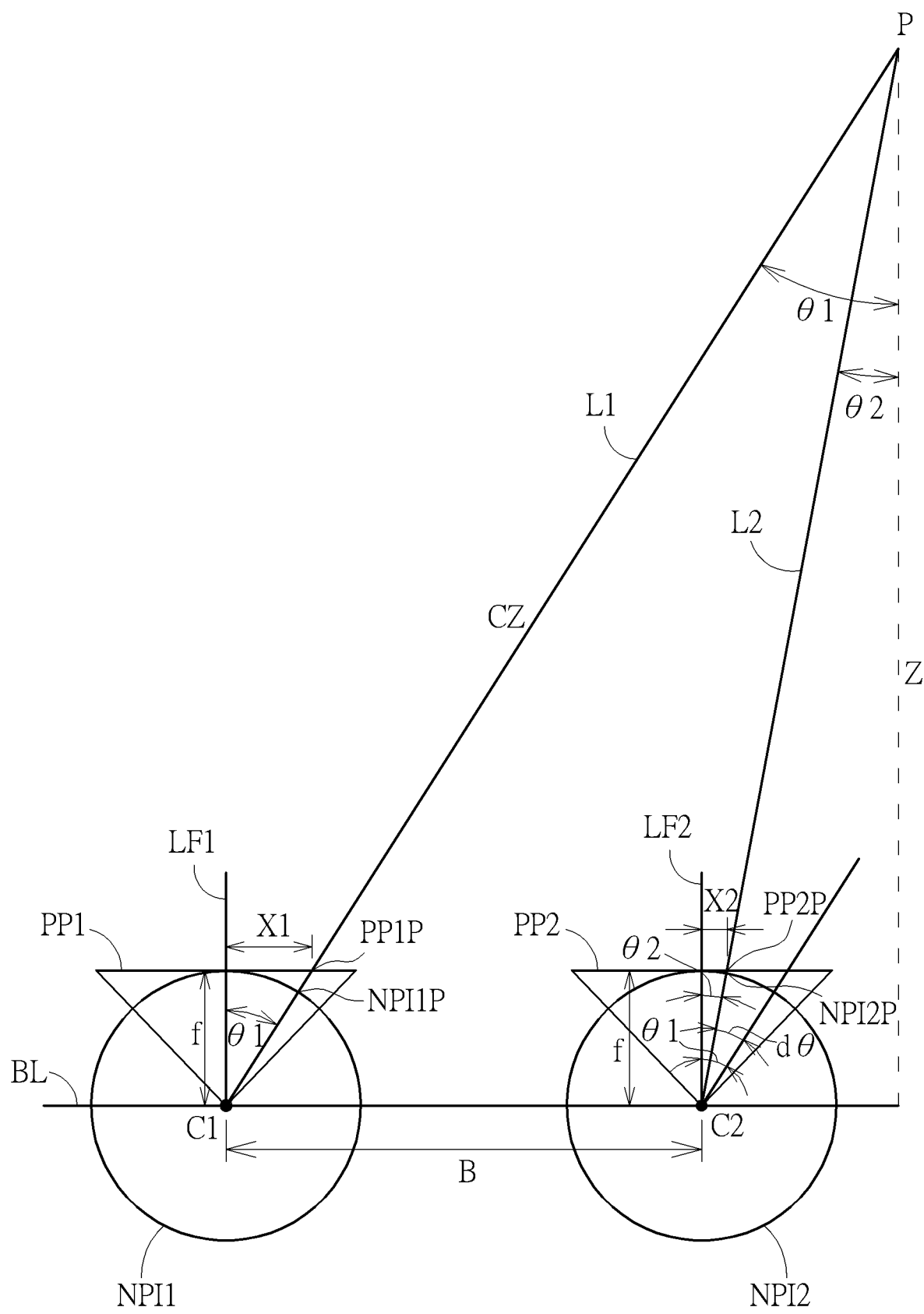
FIG. 5 is a diagram illustrating the depth engine generating the depth map according to the non-planar projection images.

Please refer to FIG. 5. FIG. 5 is a diagram illustrating the depth engine 106 generating the depth map DP according to the non-planar projection images NPI1, NPI2, wherein FIG. 5 will explain how the depth engine 106 calculates a distance corresponding to an object through the non-planar projection images NPI1, NPI2 (the 360 degree spherical images). As shown in FIG. 5, a predetermined point NPI1P on the non-planar projection image NPI1 is given, wherein an angle θ1 exists between a line L1 determined by the predetermined point NPI1P and the optical center C1 and a line LF1 where a virtual focal length f between the optical center C1 and a projection plane PP1 is located. Because the virtual focal length f and the angle θ1 are known, a distance X1 between a point PP1P of the projection plane PP1 and the line LF1 is determined through equation (1), wherein the point PP1P is determined by the predetermined point NPI1P being projected to the projection plane PP1:

$$X1 = f*\tan(\theta1) \quad (1)$$

In addition, because a first disparity between the non-planar projection images NPI1, NPI2 is known, and a projection method of the non-planar projection images NPI1, NPI2 is also known, the depth engine 106 can convert the first disparity into an angle difference dθ, and an angle θ2 can be determined by equation (2), wherein the angle θ2 corresponds to a line LF2 where a virtual focal length f between the optical center C2 and a projection plane PP2 is located:

$$\theta2 = \theta1 - d\theta \quad (2)$$

As shown in FIG. 5, because the angle θ2 can be determined by equation (2), a point NPI2P of the non-planar projection image NPI2 can also be determined by the angle θ2. Therefore, a distance X2 between a point PP2P of the projection plane PP2 and the line LF2 is determined through equation (3), wherein the point PP2P is determined by the predetermined point NPI2P being projected to the projection plane PP2:

$$X2 = f*\tan(\theta2) = f*\tan(\theta1 - d\theta) \quad (3)$$

As shown in equation (3), because the distance X2 corresponds to the first disparity, a second disparity DS between the projection plane PP1 and the projection plane PP2 can be determined through equation (4):

$$DS = X1 - X2 = f*\tan(\theta1) - f*\tan(\theta1 - d\theta) \quad (4)$$

In addition, as shown in FIG. 5, a point P of the depth map DP can be determined by the line L1 determined by the predetermined point NPI1P and the optical center C1 and the line L2 determined by the point NPI2P and the optical center C2. That is, the point P is an intersection of the line L1 and the line L2. Because the second disparity DS and the virtual focal length f are known, a distance Z between the point P and the baseline BL can be determined by equation (5), wherein B is a distance between the optical center C1 and the optical center C2:

$$Z = (f*B)/(X1 - X2) \quad (5)$$

Substituting equation (4) into equation (5) yields equation (6):

$$Z = B/(\tan(\theta1) - \tan(\theta1 - d\theta)) \quad (6)$$

Therefore, a distance CZ between the point P and the optical center C1 can be determined by equation (7):

$$CZ1 = Z/\cos(\theta1) = B/\cos(\theta1)*((\tan(\theta1) - \tan(\theta1 - d\theta))) \quad (7)$$

Similarly, a distance between the point P and the optical center C2 can be obtained through the above-mentioned equations, so further description thereof is omitted for simplicity. In addition, a distance between another point of the depth map DP and the optical center C1 can also be obtained through the above-mentioned equations, so further description thereof is also omitted for simplicity.

In addition, in another embodiment of the present invention, the non-planar projection images NPI1, NPI2 are 360 degree panoramic images (spherical images), wherein when the non-planar projection images NPI1, NPI2 are the 360 degree panoramic images (the spherical images), the depth map DP can also be obtained through the above-mentioned equations, and the depth map DP is a 360 degree panoramic depth map.

In addition, in another embodiment of the present invention, the non-planar projection images NPI1, NPI2 are 360 degree panoramic images (cylindrical images), wherein when the non-planar projection images NPI1, NPI2 are the 360 degree panoramic images (the cylindrical images), the depth map DP can be obtained through a method utilizing planar projection to obtain a distance provided by the prior art, and the depth map DP is a 360 degree panoramic depth map.

In addition, in another embodiment of the present invention, the non-planar projection images NPI1, NPI2 are non-360 degree non-planar projection images. For example, the non-planar projection images NPI1, NPI2 can be 60 degree non-planar projection images. Therefore, if the non-planar projection images NPI1, NPI2 are 60 degree non-planar projection images, and an overlapping view angle exists between non-planar projection images NPI1, NPI2 (e.g. a 30 degree overlapping view angle exists between the non-planar projection images NPI1, NPI2), the depth map DP generated by the depth engine 106 corresponds to the 30 degree overlapping view angle.

Figure 6:
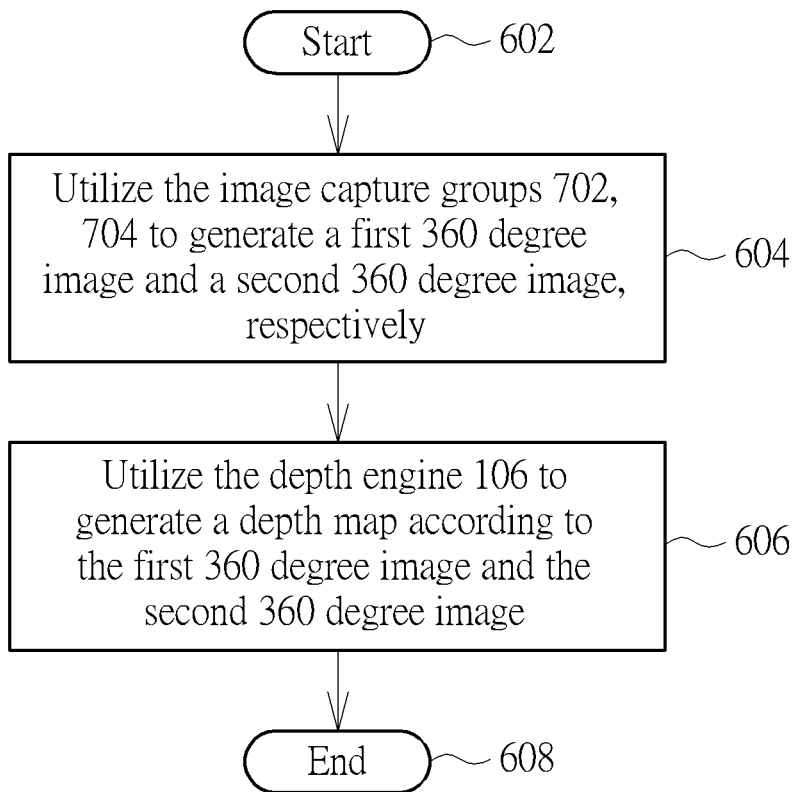
FIG. 6 is a flowchart illustrating a method utilizing non-planar projection images to generate a depth map according to a third embodiment of the present invention.
Figure 7:
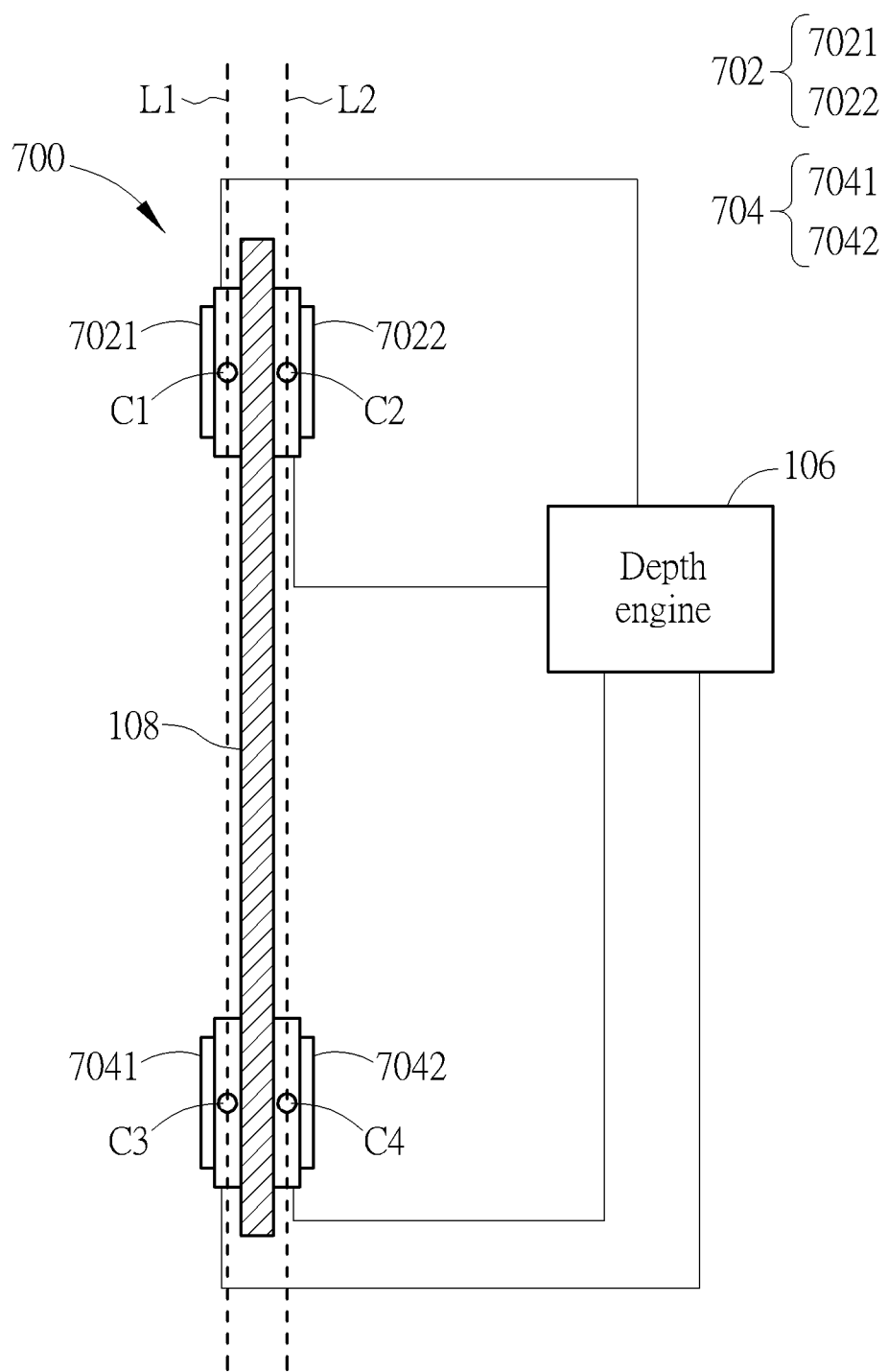
FIG. 7 is a diagram illustrating an image device utilizing non-planar projection images to generate a depth map according to a fourth embodiment of the present invention.

In addition, please refer to FIGS. 6, 7. FIG. 6 is a flowchart illustrating a method utilizing non-planar projection images to generate a depth map according to a third embodiment of the present invention, and FIG. 7 is a diagram illustrating an image device 700 utilizing non-planar projection images to generate a depth map according to a fourth embodiment of the present invention, wherein the image device 700 includes two image capture groups 702, 704 and the depth engine 106, the depth engine 106 is electrically connected to the image capture groups 702, 704, the image capture group 702 includes image capturers 7021, 7022, the image capture group 704 includes image capturers 7041, 7042, the image capturers 7021, 7022, 7041, 7042 are fisheye image capturers, and the image capturers 7021, 7022, 7041, 7042 are installed on the support unit 108. In addition, a view angle of each image capturer of the image capturers 7021, 7022, 7041, 7042 is not less than 180 degree.

In addition, the method in FIG. 6 is illustrated using the image device 700 in FIG. 7. Detailed steps are as follows:

Step 602: Start.

Step 604: Utilize the image capture groups 702, 704 to generate a first 360 degree image and a second 360 degree image, respectively.

Step 606: Utilize the depth engine 106 to generate a depth map according to the first 360 degree image and the second 360 degree image.

Step 608: End.

In Step 604, as shown in FIG. 7, the first 360 degree image generated by the image capture group 702 obviously corresponds to optical centers C1, C2 of the image capturers 7021, 7022. Similarly, the second 360 degree image generated by the image capture group 704 also obviously corresponds to optical centers C3, C4 of the image capturers 7041, 7042. When a first partial image of the first 360 degree image corresponding to a first predetermined view angle is projected to a second space, projection positions of each row of pixels of the first partial image in the second space and optical centers of corresponding image capturers of the image capture groups 702, 704 share a plane, and the second space corresponds to one image capturer of the corresponding image capturers. For example, when the first predetermined view angle is 180 degree and the second space corresponds to the image capturer 7021, the first partial image of the first 360 degree image is a left hemispherical image of the first 360 degree image, and projection positions of each row of pixels of the first partial image of the first 360 degree image in the second space, the optical center C1 of the image capturer 7021, and the optical center C3 of the image capturer 7041 share a plane, wherein the image capturer 7021 and the image capturer 7041 are the corresponding image capturers of the image capture groups 702, 704.

Similarly, when a second partial image of the first 360 degree image corresponding to a second predetermined view angle (180 degree) is projected to the second space corresponding to an image capturer (e.g. the image capturer 7022) of the image capture group 702 corresponding to the second partial image of the first 360 degree image, the second partial image of the first 360 degree image is a right hemispherical image of the first 360 degree image; when a first partial image of the second 360 degree image corresponding to a third predetermined view angle (180 degree) is projected to the second space corresponding to an image capturer (e.g. the image capturer 7041) of the image capture group 704 corresponding to the first partial image of the second 360 degree image, the first partial image of the second 360 degree image is a left hemispherical image of the second 360 degree image; and when a second partial image of the second 360 degree image corresponding to a fourth predetermined view angle (180 degree) is projected to the second space corresponding to an image capturer (e.g. the image capturer 7042) of the image capture group 704 corresponding to the second partial image of the second 360 degree image, the second partial image of the second 360 degree image is a right hemispherical image of the second 360 degree image.

Therefore, in Step 606, as shown in FIG. 7, when a line L1 where the optical centers C1, C3 are located is parallel to a line L2 where the optical centers C2, C4 are located, the depth engine 106 can directly combine the first partial image of the first 360 degree image (the left hemispherical image of the first 360 degree image) with the second partial image of the first 360 degree image (the right hemispherical image of the first 360 degree image) to generate a first spherical image, and directly combine the first partial image of the second 360 degree image (the left hemispherical image of the second 360 degree image) with the second partial image of the second 360 degree image (the right hemispherical image of the second 360 degree image) to generate a second spherical image. That is, when the line L1 where the optical centers C1, C3 are located is parallel to the line L2 where the optical centers C2, C4 are located, the depth engine 106 can neglect a distance between the optical centers C1, C2. Therefore, the depth engine 106 can utilize the first spherical image and the second spherical image to generate the depth map according to the above-mentioned equations for generating the depth map DP.

Figure 8:
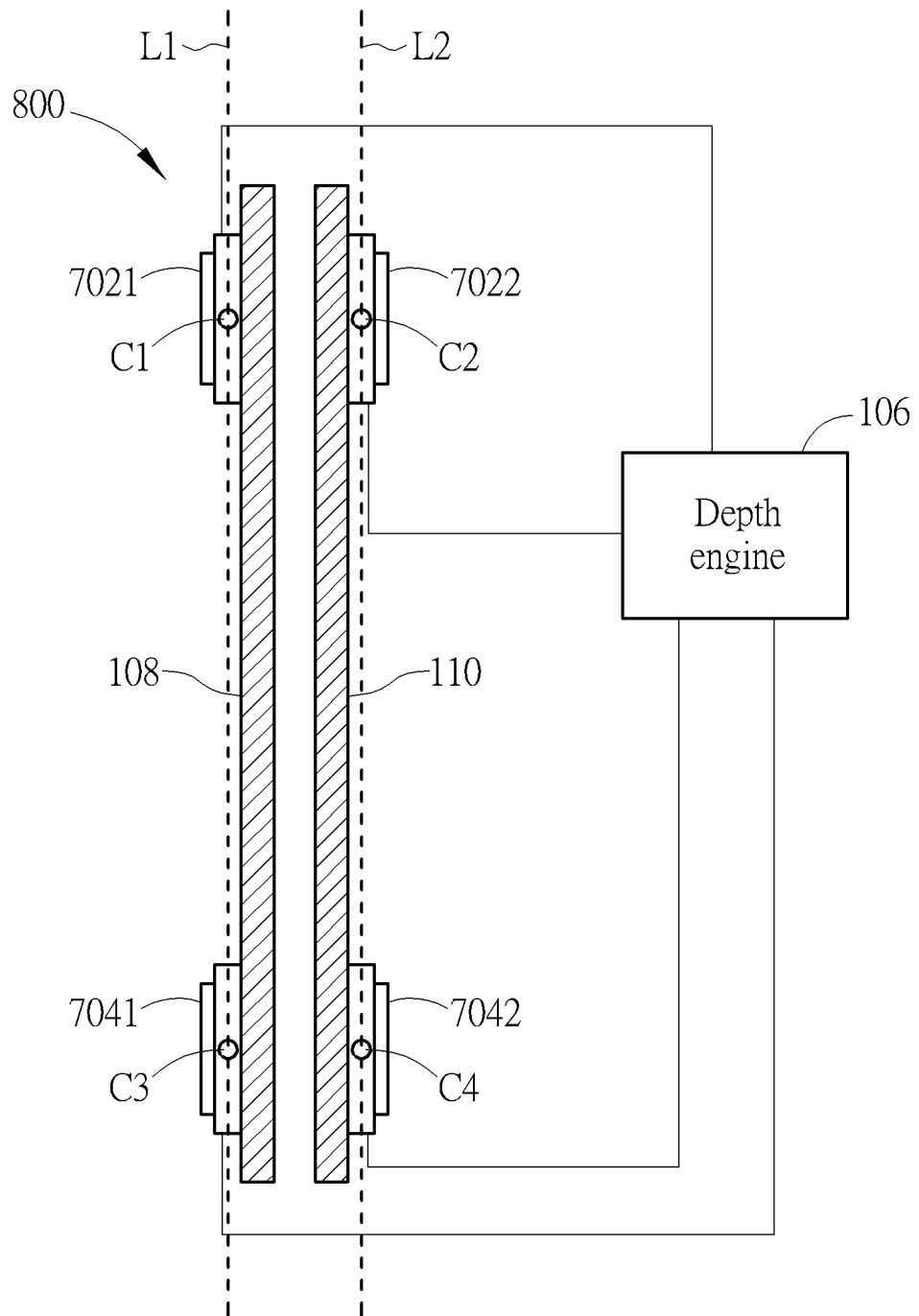
FIG. 8 is a diagram illustrating an image device utilizing non-planar projection images to generate a depth map according to a fifth embodiment of the present invention.

In addition, please refer to FIG. 8. FIG. 8 is a diagram illustrating an image device 800 utilizing non-planar projection images to generate a depth map according to a fifth embodiment of the present invention. As shown in FIG. 8, a difference between the image device 800 and the image device 700 is that the image capturers 7021, 7041 of the image device 800 are installed on the support unit 108 and the image capturers 7022, 7042 of the image device 800 are installed on a support unit 110. In addition, because the line L1 where the optical centers C1, C3 are located is parallel to the line L2 where the optical centers C2, C4 are located, the depth engine 106 can utilize the first 360 degree image generated by the image capturers 7021, 7022 and the second 360 degree image generated by the image capturers 7041, 7042 to generate a depth map through the above-mentioned equations for generating the depth map DP. In addition, subsequent operational principles of the image device 800 are the same as those of the image device 700, so further description thereof is omitted for simplicity.

Figure 9:
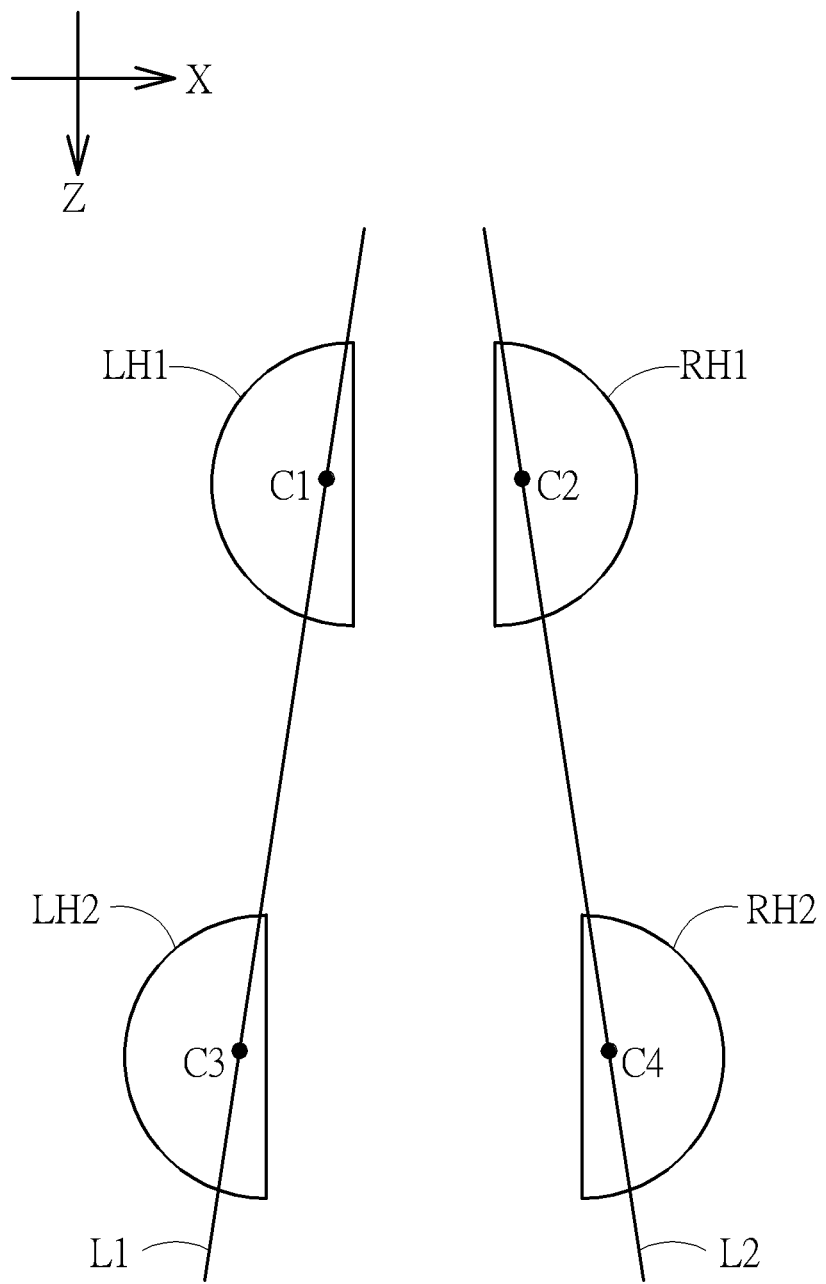
FIG. 9 is a diagram illustrating lines where the optical centers corresponding to the two image capture groups being not parallel to each other.
Figure 10:
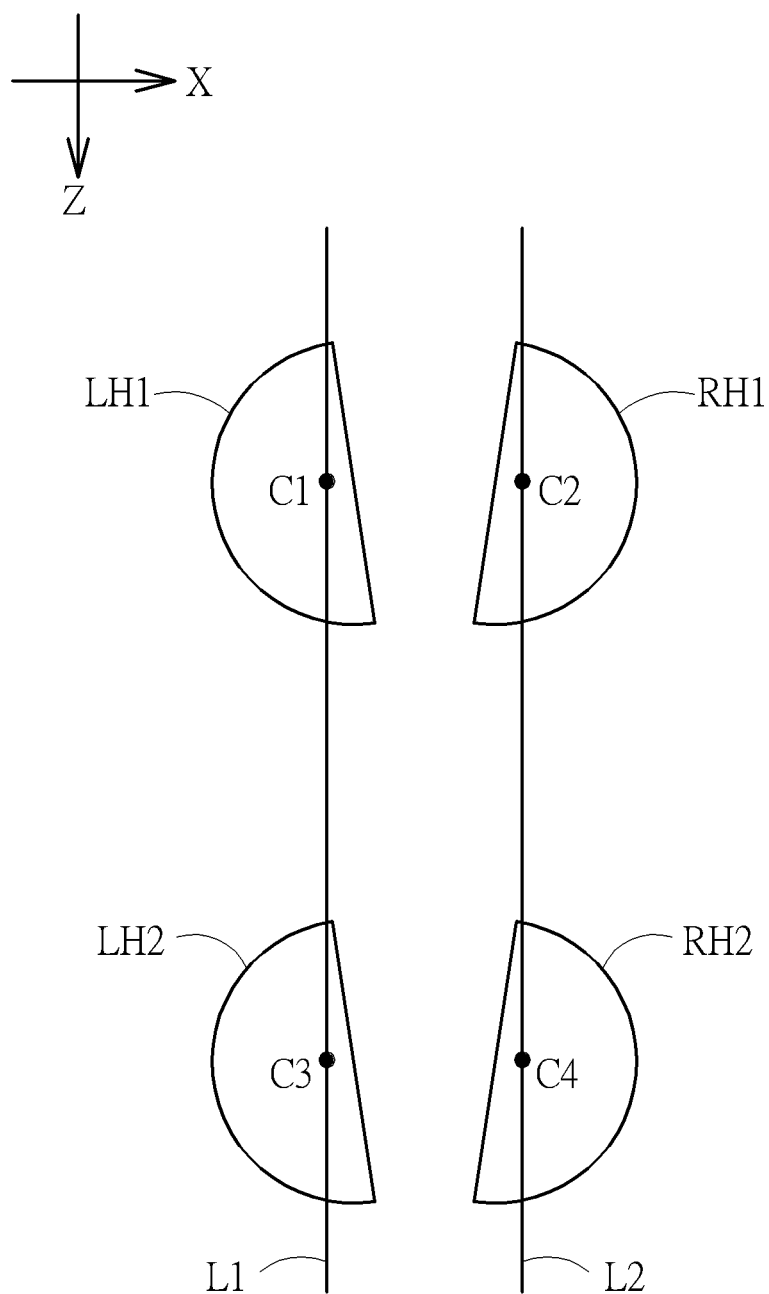
FIG. 10 is a diagram illustrating the depth engine rotating the left hemispherical image of the first 360 degree image, the right hemispherical image of the first 360 degree image, the left hemispherical image of the second 360 degree image, and the right hemispherical image of the second 360 degree image to make the line corresponding to the left hemispherical image of the first 360 degree image and the left hemispherical image of the second 360 degree image be parallel to the line corresponding to the right hemispherical image of the first 360 degree image and the right hemispherical image of the second 360 degree image.
Figure 11:
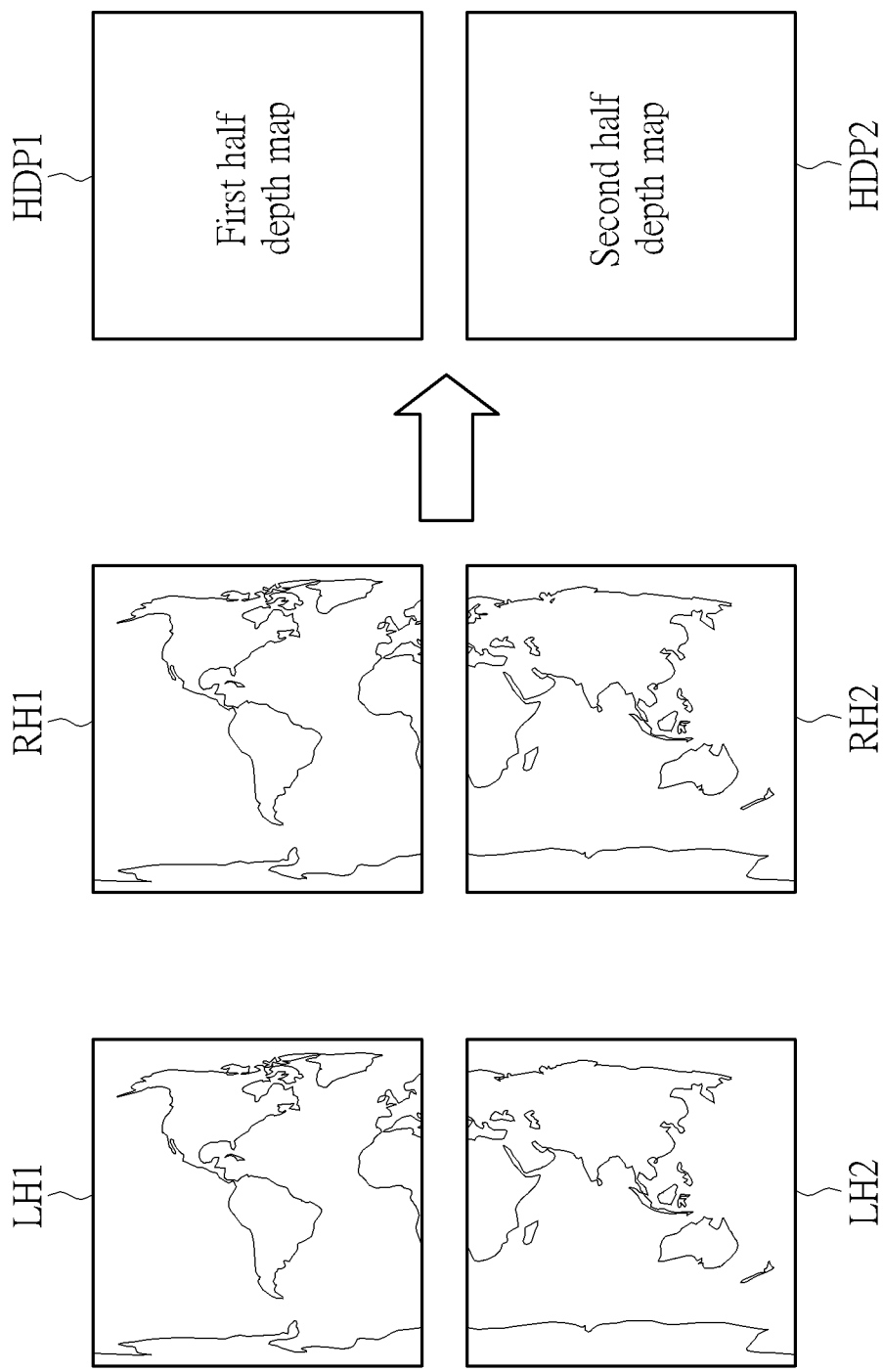
FIG. 11 is a diagram illustrating the depth engine generating the first half depth map according to the left hemispherical image of the first 360 degree image and the left hemispherical image of the second 360 degree image, and generating the second half depth map according to the right hemispherical image of the first 360 degree image and the right hemispherical image of the second 360 degree image.

In addition, in Step 606, if the line L1 where the optical centers C1, C3 are located is not parallel to the line L2 where the optical centers C2, C4 are located (as shown in FIG. 9), in one embodiment of the present invention, the depth engine 106 can first rotate the left hemispherical image (LH1) of the first 360 degree image and the left hemispherical image (LH2) of the second 360 degree image to make projection positions of each row of pixels of the left hemispherical image (LH1) and the left hemispherical image (LH2), the optical center C1, and the optical centers C3 share a plane, rotate the right hemispherical image (RH1) of the first 360 degree image and the right hemispherical image (RH2) of the second 360 degree image to make projection positions of each row of pixels of the right hemispherical image (RH1) and the right hemispherical image (RH2), the optical center C2, and the optical centers C4 share a plane, and make the line L1 is parallel to the line L2 (as shown in FIG. 10), wherein when the line L1 is parallel to the line L2, the left hemispherical image (LH1) of the first 360 degree image and the right hemispherical image (RH1) of the first 360 degree image can be considered to correspond to a first equivalent virtual optical center (wherein the first equivalent virtual optical center is generated by combining the optical center C1 with the optical center C2 after a space between the line L1 and the line L2 is compressed), and the left hemispherical image (LH2) of the second 360 degree image and the right hemispherical image (RH2) of the second 360 degree image can also be considered to correspond to a second equivalent virtual optical center (wherein the second equivalent virtual optical center is generated by combining the optical center C3 with the optical center C4 after the space between the line L1 and the line L2 is compressed). Thus, the depth engine 106 can utilize steps shown in FIG. 6 to generate the 360 degree depth map. As shown in FIG. 10, although the line L1 is parallel to the line L2, because seams between the left hemispherical image (LH1) of the first 360 degree image, the right hemispherical image (RH1) of the first 360 degree image, the left hemispherical image (LH2) of the second 360 degree image, and the right hemispherical image (RH2) of the second 360 degree image may not be smooth, the depth engine 106 generates a first half depth map HDP1 (as shown in FIG. 11) according to the rotated left hemispherical image (LH1) of the first 360 degree image and the rotated left hemispherical image (LH2) of the second 360 degree image, and generates a second half depth map HDP2 (as shown in FIG. 11) according to the rotated right hemispherical image (RH1) of the first 360 degree image and the rotated right hemispherical image (RH2) of the second 360 degree image. In addition, because the depth engine 106 will stitch the first half depth map HDP1 and the second half depth map HDP2 to generate the depth map, view angles corresponding to the first half depth map HDP1 and the second half depth map HDP2 are greater than 180 degree. In addition, because directions of the line L1 and the line L2 are fixed by the depth engine 106 (as shown in FIG. 10), when the depth engine 106 stitches the first half depth map HDP1 and the second half depth map HDP2, the depth engine 106 can rotate the first half depth map HDP1 along the line L1 and rotate the second half depth map HDP2 along the line L2 to make a seam between the first half depth map HDP1 and the second half depth map HDP2 be smooth. In addition, in another embodiment of the present invention, the depth engine 106 can arbitrarily rotate the first half depth map HDP1 and the second half depth map HDP2 to make the seam between the first half depth map HDP1 and the second half depth map HDP2 smooth.

In addition, the present invention is not limited to the image device 700 including the two image capture groups 702, 704. That is, the image device 700 can include at least two image capture groups. When the image device 700 includes more than two image capture groups, the image device 700 can still generate the depth map through the above-mentioned equations.

Figure 12:
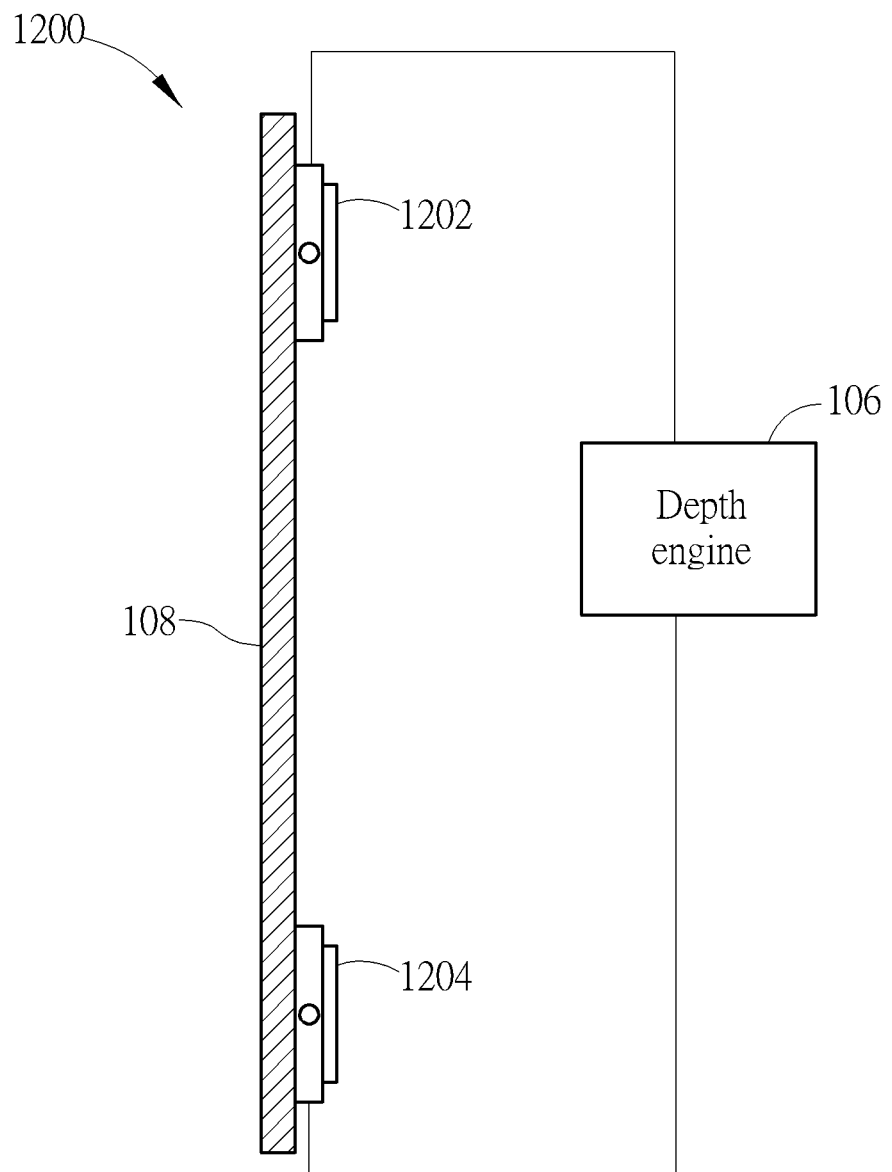
FIG. 12 is a diagram illustrating an image device utilizing non-planar projection images to generate a depth map according to a fifth embodiment of the present invention.

In addition, please refer to FIG. 12. FIG. 12 is a diagram illustrating an image device 1200 utilizing non-planar projection images to generate a depth map according to a fifth embodiment of the present invention, wherein the image device 1200 includes two image capturers 1202, 1204 and the depth engine 106, the depth engine 106 is electrically connected to the image capturers 1202, 1204, the image capturers 1202, 1204 are fisheye image capturers, and the image capturers 1202, 1204 are installed on the support unit 108. In addition, a view angle of each image capturer of the image capturers 1202, 1204 is not less than 180 degree. As shown in FIG. 12, a difference between the image device 1200 and the image device 700 is that the image capturers 1202, 1204 of the image device 1200 are installed on the same side of the support unit 108, so a depth map generated by the depth engine 106 of the image device 1200 is a part of the depth map generated by the depth engine 106 of the image device 700. For example, the depth map generated by the depth engine 106 of the image device 1200 is a right hemispherical part of the depth map generated by the depth engine 106 of the image device 700. In addition, subsequent operational principles of the image device 1200 are the same as those of the image device 700, so further description thereof is omitted for simplicity.

In addition, the depth engine 106 can be a field programmable gate array (FPGA) with the above-mentioned functions of the depth engine 106, or an application-specific integrated circuit (ASIC) with the above-mentioned functions of the depth engine 106, or a software module with the above-mentioned functions of the depth engine 106.

Figure 13:
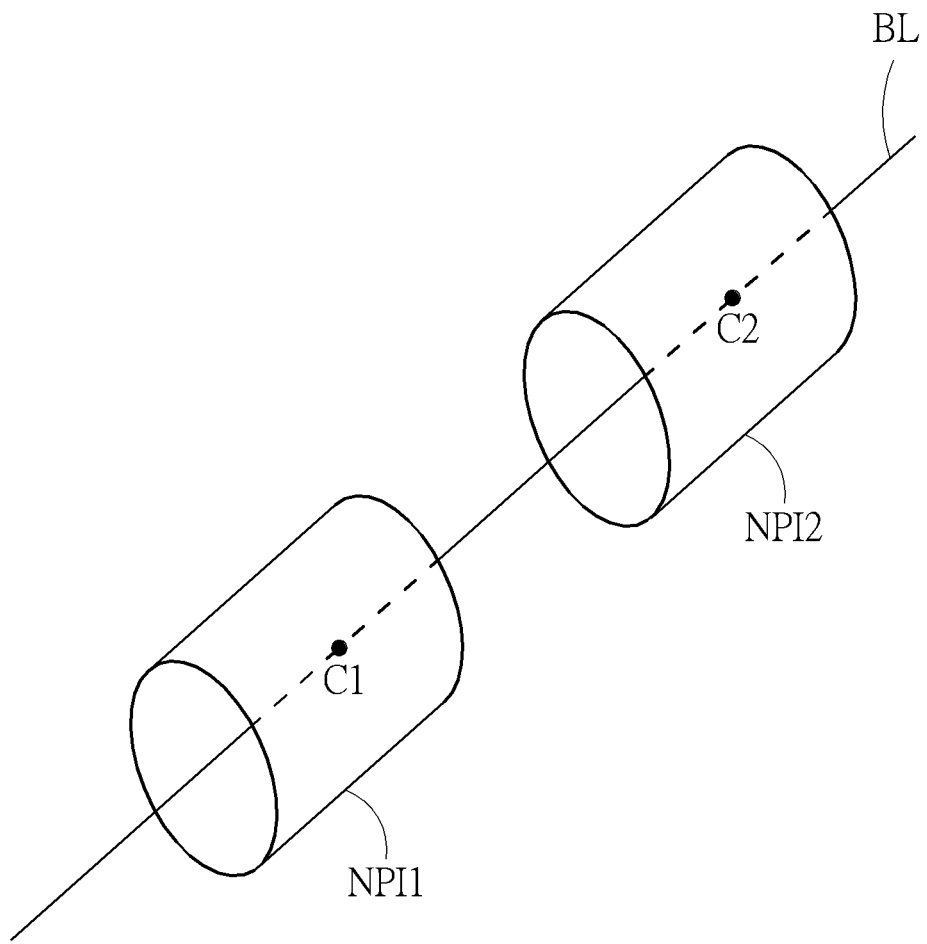
FIG. 13 is a diagram illustrating the non-planar projection images being 360 degree cylindrical images.

In addition, in another embodiment of the present invention, the non-planar projection images NPI1, NPI2 are 360 degree cylindrical images (as shown in FIG. 13), wherein the non-planar projection image NPI1 corresponds to an optical center C1 and the non-planar projection image NPI2 corresponds to an optical center C2. In addition, when the non-planar projection images NPI1, NPI2 are the 360 degree cylindrical images, a 360 degree cylindrical depth map can also be obtained through the methods shown in FIGS. 2, 6 or the method utilizing planar projection to obtain a distance provided by the prior art, so further description thereof is omitted for simplicity.

Figure 14:
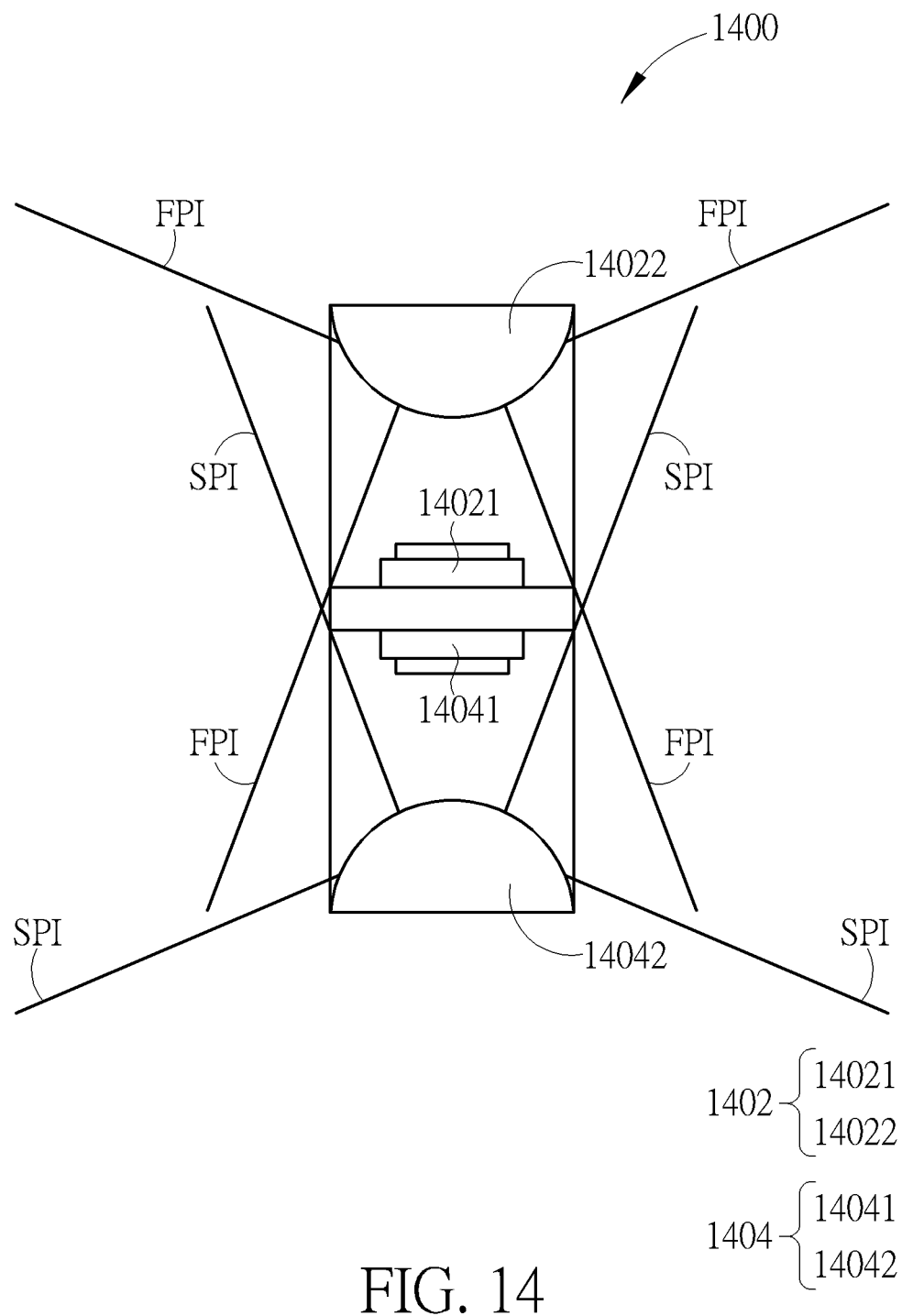
FIG. 14 is a diagram illustrating an image device utilizing non-planar projection images to generate a depth map according to a sixth embodiment of the present invention.

In addition, please refer to FIG. 14. FIG. 14 is a diagram illustrating an image device 1400 utilizing non-planar projection images to generate a depth map according to a sixth embodiment of the present invention, wherein the image device 1400 includes two image capture groups 1402, 1404 and the depth engine 106, the image capture group 1402 includes an image capturer 14021 and a mirror 14022, the image capture group 1404 includes an image capturer 14041 and a mirror 14042. In addition, for simplifying FIG. 14, FIG. 14 does not show connections between the depth engine 106 and the image capturers 14021, 14041. As shown in FIG. 14, the image capturer 14021 can capture a first 360 degree panoramic image FPI through the mirror 14022, and the image capturer 14041 can capture a second 360 degree panoramic image SPI through the mirror 14042 (wherein FIG. 14 only shows cross-sections of the first 360 degree panoramic image FPI and the second 360 degree panoramic image SPI), wherein the first 360 degree panoramic image FPI corresponds to at least one virtual optical center of the mirror 14022, and the second 360 degree panoramic image SPI corresponds to at least one virtual optical center of the mirror 14042. For example, taking the first 360 degree panoramic image FPI as an example, when a partial image of the first 360 degree panoramic image FPI corresponding to a predetermined view angle is projected to a space, projection positions of each row of pixels of the partial image of the first 360 degree panoramic image FPI in the space and two corresponding virtual optical centers of at least two virtual optical centers of the image capture groups 1402, 1404 share a plane, and the space corresponds to one virtual optical center of the two corresponding virtual optical centers. Therefore, the depth engine 106 of the image device 1400 can utilize an overlapping area between the first 360 degree panoramic image FPI and the second 360 degree panoramic image SPI to generate a 360 degree panoramic depth map through the methods shown in FIGS. 2, 6. In addition, it is obvious to one of ordinary skill in the art that the at least one virtual optical center of the mirror 14022 is determined through the first 360 degree panoramic image FPI and the at least one virtual optical center of the mirror 14042 is determined through the second 360 degree panoramic image SPI, so further description thereof is omitted for simplicity.

To sum up, because the image device and the related method thereof provided by the present invention generate a 360 degree panoramic (or spherical, or cylindrical) depth map, or generate a part of the 360 degree panoramic (or spherical, or cylindrical) depth map according to at least two non-planar projection images, compared to the prior art, the present invention needs less image capturers. That is, the present invention can utilize simpler mechanism to generate the 360 degree panoramic (or spherical, or cylindrical) depth map, or generate the part of the 360 degree panoramic (or spherical, or cylindrical) depth map.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method utilizing non-planar projection images to generate a depth map, comprising:
  utilizing two image capturing circuit groups to generate two 360 degree images, wherein each image capturing curcuit group of the two image capture groups comprises at least two image capturing circuits, when a partial image of a 360 degree image of the two 360 degree images corresponding to a predetermined view angle is projected to a space, projection positions of each row of pixels of the partial image of the 360 degree image in the space and optical centers of corresponding image capturing circuits of the two image capturing circuit groups share a plane, and the space corresponds to one image capturing circuit of the corresponding image capturing circuits; and
  utilizing a depth generation circuit to generate a depth map according to the two 360 degree images.

2. The method of claim 1, wherein the two 360 degree images are 360 degree panoramic images, and the depth map is a 360 degree panoramic depth map.

3. The method of claim 1, wherein the two 360 degree images are 360 degree spherical images or 360 degree cylindrical images, and the depth map is a 360 degree spherical depth map or a 360 degree cylindrical depth map.

4. An image device utilizing non-planar projection images to generate a depth map, comprising:
  two image capturing circuit groups generating two 360 degree images, wherein each image capturing circuit group of the two image capturing circuit groups includes at least two image capturing circuits, and when a partial image of a 360 degree image of the two 360 degree images corresponding to a predetermined view angle is projected to a space, projection positions of each row of pixels of the partial image of the 360 degree image in the space and optical centers of corresponding image capturing circuits of the two image capturing circuit groups share a plane, and the space corresponds to an image capturing circuit of the corresponding image capturing circuits; and
  a depth generation circuit a depth map according to the two 360 degree images.

5. The image device of claim 4, further comprising:
a support unit, wherein the two image capturing circuit groups are installed on the support unit.

6. The image device of claim 4, further comprising:
at least two support units, wherein the two image capturing circuit groups are installed on the at least two support units.

* * * * *